(12) United States Patent
Stachowiak (10) Patent No.: US 7,405,004 B2
(45) Date of Patent: Jul. 29, 2008

(54) HEAT TREATABLE COATED ARTICLE AND METHOD OF MAKING SAME

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 130 days.

(21) Appl. No.: 11/393,727

(22) Filed: Mar. 31, 2006

(65) Prior Publication Data

US 2006/0172138 A1   Aug. 3, 2006

Related U.S. Application Data

(63) Continuation of application No. 10/683,117, filed on Oct. 14, 2003, now Pat. No. 7,081,301.

(51) Int. Cl.
*B32B 17/06* (2006.01)

(52) U.S. Cl. ............... 428/428; 428/432; 428/697; 428/699; 428/701; 428/702

(58) Field of Classification Search ............... None
See application file for complete search history.

(56) References Cited

U.S. PATENT DOCUMENTS

| | | |
|---|---|---|
| 4,071,649 A | 1/1978 | Jacquemin et al. |
| 4,462,883 A | 7/1984 | Hart |
| 4,894,290 A | 1/1990 | Chesworth et al. |
| 5,059,295 A | 10/1991 | Finley |
| 5,201,926 A | 4/1993 | Szczyrbowski et al. |
| 5,229,194 A | 7/1993 | Lingle et al. |
| 5,318,685 A | 6/1994 | O'Shaughnessy |
| 5,387,433 A | 2/1995 | Balian et al. |
| 5,395,698 A | 3/1995 | Neuman et al. |
| 5,514,476 A | 5/1996 | Hartig et al. |
| 5,557,462 A | 9/1996 | Hartig et al. |
| 5,837,108 A | 11/1998 | Lingle et al. |
| 6,352,755 B1 | 3/2002 | Finley et al. |
| 6,475,626 B1 | 11/2002 | Stachowiak |
| 6,495,263 B2 | 12/2002 | Stachowiak |
| 6,514,620 B1 | 2/2003 | Lingle et al. |
| 6,524,714 B1 | 2/2003 | Neuman et al. |
| 6,558,800 B1 | 5/2003 | Stachowiak |

(Continued)

FOREIGN PATENT DOCUMENTS

| | | |
|---|---|---|
| EP | 05124839 | 5/1993 |
| EP | 1 238 950 | 9/2005 |
| WO | WO 01/21540 | 3/2001 |

OTHER PUBLICATIONS

U.S. Appl. No. 10/683,117, filed Oct. 14, 2003.
U.S. Appl. No. 10/406,003, filed Apr. 3, 2003.
U.S. Appl. No. 10/608,560, filed Jun. 30, 2003.

*Primary Examiner*—Gwendolyn Blackwell
(74) *Attorney, Agent, or Firm*—Nixon & Vanderhye P.C.

(57) ABSTRACT

A coated article or layer system is provided which includes at least one infrared (IR) reflecting layer including niobium (Nb) sandwiched between at least a pair of dielectric layers. In certain embodiments, a Cr inclusive barrier layer is provided to protect the Nb inclusive IR reflecting layer, for chemical durability purposes. In other example embodiments, a protective overcoat including a zirconium oxide inclusive layer may be provided to protect the Nb inclusive IR reflecting layer for durability purposes.

11 Claims, 6 Drawing Sheets

U.S. PATENT DOCUMENTS

| | | |
|---|---|---|
| 6,576,349 B2 | 6/2003 | Lingle et al. |
| 6,852,419 B2 | 2/2005 | Stachowiak |
| 6,908,679 B2 | 6/2005 | Stachowiak et al. |
| 6,994,910 B2 | 2/2006 | Stachowiak |
| 2002/0192473 A1* | 12/2002 | Gentilhomme et al. ...... 428/432 |
| 2004/0009356 A1* | 1/2004 | Medwick et al. ............ 428/432 |

* cited by examiner

HEAT TREATABLE COATED ARTICLE AND METHOD OF MAKING SAME

This application is a continuation of application Ser. No. 10/683,117, filed Oct. 14, 2003, now U.S. Pat. No. 7,081,301 the entire content of which is hereby incorporated herein by reference in this application.

This invention relates to coated articles that include at least a chromium (Cr) inclusive barrier layer(s) and/or an overcoat including a zirconium (Zr) oxide inclusive layer. In certain example embodiments, a Cr inclusive barrier layer (e.g., of or including Cr, $CrN_x$ or the like) may be used to protect a niobium (Nb) inclusive infrared (IR) reflecting layer (Nb, $NbN_x$, NbCr, $NbCrN_x$, $NbZrO_x$, or the like) from damage from chemical attack or the like. In other example embodiments, an overcoat including a silicon nitride inclusive layer and a zirconium oxide inclusive layer may be provided. Such coated articles may be used in the context of monolithic windows, insulating glass (IG) window units, laminated windows, and/or other suitable applications.

BACKGROUND OF THE INVENTION

Solar control coatings having a layer stack of glass/$Si_3N_4$/NiCr/$Si_3N_4$ are known in the art, where the metallic NiCr layer is the sole infrared (IR) reflecting layer in the coating.

Unfortunately, while such layer stacks provide efficient solar control and are overall good coatings, they sometimes are lacking in terms of: (a) corrosion resistance to acid (e.g., HCl boil); (b) mechanical performance such as scratch resistance; and/or (c) thermal stability upon heat treatment for tempering, heat bending, or the like (i.e., $\Delta E^*$ value(s)). For example, a known heat treatable coated article having a layer stack of glass/$Si_3N_4$/NiCr/$Si_3N_4$ has an undesirably high glass side reflective $\Delta E^*$ value of above 5.0 after heat treatment (HT) at 625 degrees C. for ten minutes. This high glass side reflective $\Delta E^*$ value means that the coated article when HT will not approximately match its non-HT counterpart with respect to glass side reflective color.

Accordingly, there exists a need in the art for a coated article that has improved characteristics with respect to (a), (b) and/or (c) compared to a conventional layer stack of glass/$Si_3N_4$/NiCr/$Si_3N_4$, but which still is capable of acceptable solar control (e.g., blocking a reasonable amount of IR and/or UV radiation) and/or heat treatment.

Commonly owned U.S. patent application Ser. No. 10/338,878 (hereby incorporated herein by reference) discloses a coated article comprising glass/$Si_3N_4$/NbN/$Si_3N_4$. This coated article is advantageous with respect to the aforesaid glass/$Si_3N_4$/NiCr/$Si_3N_4$ in terms of color stability upon heat treatment. In particular, coated articles of glass/$Si_3N_4$/NbN/$Si_3N_4$ described in Ser. No. 10/338,878 may be able to achieve $\Delta E^*$ values due to heat treatment of less than or equal to 3.0, more preferably less than or equal to 2.5, and so forth.

Unfortunately, while coatings with Nb and NbN IR reflecting layers achieve excellent thermal performance and mechanical durability, their ability to withstand chemical attack is suspect. For example, coated articles of glass/$Si_3N_4$/NbN/$Si_3N_4$ and glass/$Si_3N_4$/Nb/$Si_3N_4$ have less than desirable resistance to alkaline attack and oxidation at elevated temperatures.

Thus, it will be appreciated by those skilled in the art that there exists a need for a technique for improving chemical durability of coated articles including Nb inclusive IR reflecting layer(s). In certain other embodiments set forth below, such technique(s) may also be applied to coatings including other types of IR reflecting layers such as Ni or Ni alloy IR reflecting layers.

SUMMARY OF EXAMPLE EMBODIMENTS OF THE INVENTION

In certain example embodiments of this invention, a coating or layer system is provided which includes at least one infrared (IR) reflecting layer comprising niobium (Nb) sandwiched between at least a pair of dielectric layers. Examples of such Nb inclusive IR reflecting layers include Nb, $NbN_x$, NbCr, $NbCrN_x$, and/or $NbZrO_x$ IR reflecting layers. Due to its spectral selectivity, niobium inclusive layers provide thermal performance (e.g., IR blocking) similar to NiCr, but are surprisingly more durable in certain respects and have improved color stability upon heat treatment (HT) compared to NiCr.

In order to protect the Nb inclusive IR reflecting layer(s) from alkaline attack and/or oxidation at elevated temperatures, such Nb inclusive IR reflecting layer(s) is/are protected by at least one Cr inclusive barrier layer. For example, and without limitation, a Cr or chromium nitride ($CrN_x$) inclusive barrier layer may be provided over an Nb inclusive IR reflecting layer. It has surprisingly been found that even a thin Cr or $CrN_x$ inclusive barrier layer over a Nb inclusive IR reflecting layer allows such coated articles to realize remarkably improved chemical durability (e.g., resistance to alkaline attacks measured by a NaOH boil test or the like). Moreover, good thermal performance and optical characteristics are also achieved. In certain example embodiments, a $CrO_x$ inclusive barrier layer over a Nb inclusive IR reflecting layer may also be used.

In certain other example embodiments of this invention, a multi-layer overcoat is provided so as to include a layer comprising a nitride (e.g., silicon nitride) which supports a layer comprising zirconium oxide ($ZrO_x$). Such an overcoat can also improve mechanical and/or chemical durability of the coated article. In a dual layer overcoat of nitride/$ZrO_x$ for example, the zirconium oxide provides mechanical and chemical durability (e.g., scratch resistance and resistance to corrosion from alkaline solutions and the like), and the underlying nitride inclusive layer (e.g., silicon nitride) provides heat treatability by preventing significant amounts of oxygen from diffusing from the zirconium oxide into the IR reflecting layer during heat treatment (HT). Thus, the nitride inclusive layer may, in certain example embodiments, allow the coated article of have a rather low $\Delta E^*$ value due to heat treatment (HT).

Thus, it has surprisingly been found that the combination of nitride/$ZrO_x$ in a multi-layer overcoat allows for a coated article which is chemically and mechanically durable, has acceptable optical properties such as transmittance and/or reflectance, and which is heat treatable in a commercially acceptable manner. It has also been surprisingly found that the combination of nitride/$ZrO_x$ in a multi-layer overcoat significantly improves a coated article's resistance to damage by high humidity environments, thereby improving storage life.

Coated articles according to certain embodiments of this invention may be used as monolithic windows due to their excellent durability characteristics, which may or may not be heat treated. Alternatively, coated articles according to this invention may also be used in the context of insulating glass (IG) window units, or in other suitable applications, which may or may not involve heat treatment.

In certain example embodiments of this invention, heat treated (HT) coated articles including a niobium inclusive IR reflecting layer have a glass side reflective ΔE* value of no greater than 3.0, more preferably no greater than 2.5, even more preferably no greater than 2.0, and most preferably no greater than 1.8. For purposes of example, the heat treatment (HT) may be for at least about 5 minutes at a temperature(s) of at least about 580 degrees C., for purposes of example only.

In certain example embodiments of this invention, there is provided a coated article including a layer system supported by a glass substrate, the layer system comprising: an Nb inclusive IR reflecting layer located between at least first and second dielectric layers; and a Cr inclusive barrier layer located over and directly contacting the Nb inclusive IR reflecting layer.

In other example embodiments of this invention, there is provided a coated article including a layer system supported by a glass substrate, the layer system comprising: an Nb or Ni inclusive IR reflecting layer located between at least first and second dielectric layers; and a protective overcoat including a layer comprising zirconium oxide for protecting the Nb or Ni inclusive IR reflecting layer.

In certain other example embodiments of this invention, there is provided a coated article including a coating supported by a glass substrate, wherein the coating comprises: an IR reflecting layer; and an overcoat layer provided over the IR reflecting layer, wherein the overcoat layer comprises an oxide of ZrY. The coated article of this embodiment may or may not be heat treated.

In other example embodiments of this invention, there is provided a coated article including a coating supported by a glass substrate, wherein the coating comprises: an IR reflecting layer; and an overcoat layer provided over the IR reflecting layer, wherein the overcoat layer comprises an oxide and/or nitride of SiZr. The coated article may or may not be heated treated in such embodiments.

DETAILED DESCRIPTION OF CERTAIN EXAMPLE EMBODIMENTS OF THE INVENTION

Certain embodiments of this invention provide a coating or layer system that may be used in windows such as monolithic windows (e.g., vehicle, residential, or architectural windows), IG window units, and/or other suitable applications. Certain example embodiments of this invention provide a coated article of layer system that is characterized by good (a) corrosion resistance to acid (e.g., which can be tested via an HCl boil); (b) mechanical performance such as scratch resistance; and/or (c) thermal stability upon heat treatment. With respect to thermal stability upon heat treatment (HT), this means a low value of ΔE*; where Δ is indicative of change in view of HT such as thermal tempering, heat bending, or thermal heat strengthening, monolithically and/or in the context of dual pane environments such as IG units or laminates. Such heat treatments sometimes necessitate heating the coated substrate to temperatures from about 580° C. up to about 800° C. for 5 minutes or more.

Figure 1:
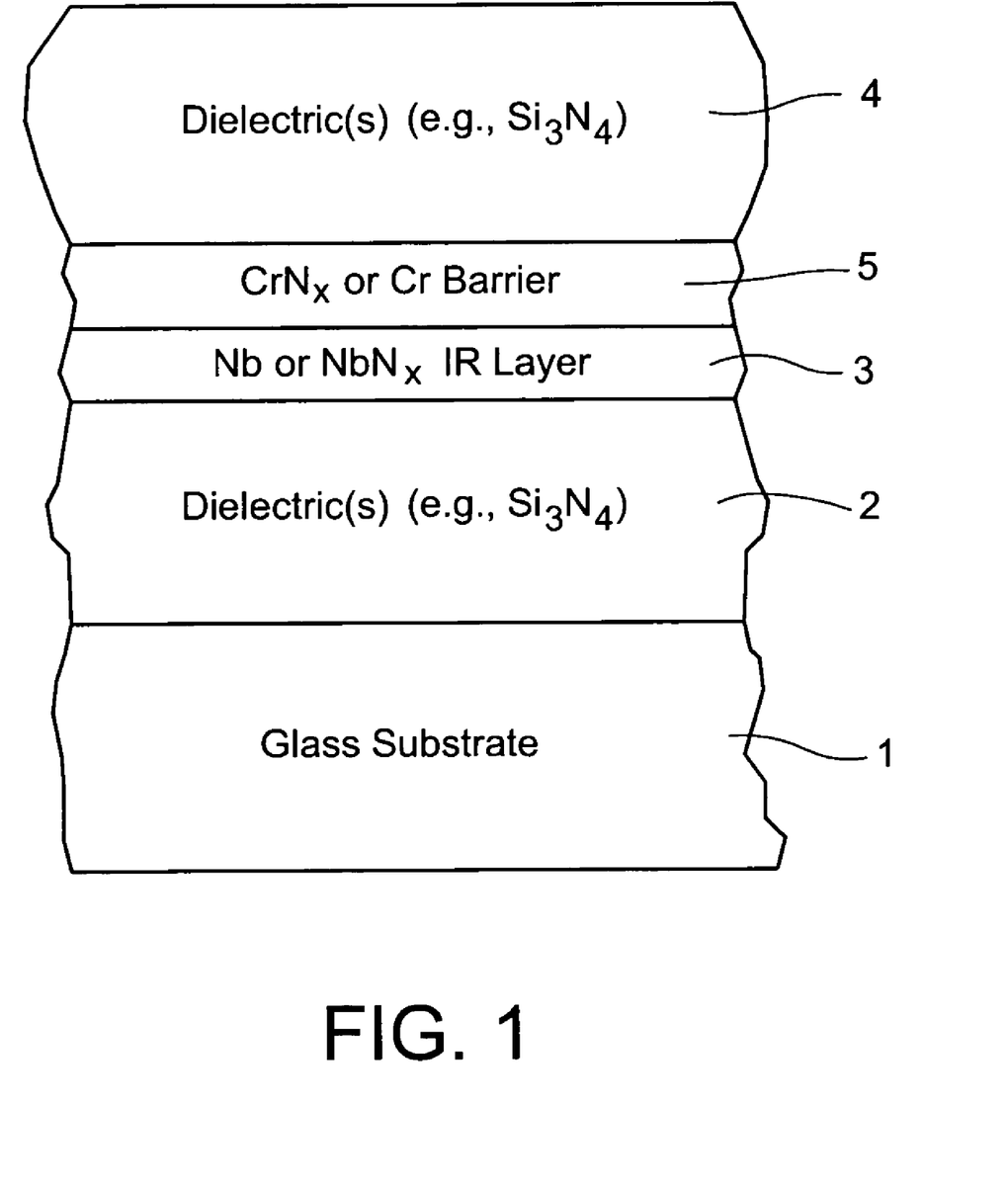
FIG. 1 is a partial cross sectional view of an embodiment of a monolithic coated article (heat treated or not heat treated) according to an example embodiment of this invention.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), tin oxide, or some other suitable dielectric), infrared (IR) reflecting layer 3 comprising Nb, second dielectric layer(s) 4 (e.g., of or including silicon nitride (e.g., $Si_3N_4$), tin oxide, or some other suitable dielectric), and Cr or chromium nitride ($CrN_x$) barrier layer 5 located between at least dielectric layer(s) 4 and Nb inclusive IR reflecting layer 3. In certain example embodiments of this invention, the overall coating does not include any metallic IR reflecting layer such as Ag or Au. In such embodiments, niobium inclusive IR reflecting layer 3 does not contact any metal IR reflecting layer of Ag or Au.

It is noted that the terms "oxide" and "nitride" as used herein include various stoichiometries. Moreover, silicon nitride layers may be doped with Al or stainless steel as is known in the art. Layers 2-5 may be deposited on substrate 1 via magnetron sputtering, or via any other suitable technique in different embodiments of this invention.

In certain example embodiments, the IR reflecting layer 3 includes at least 10% Nb, more preferably at least 20% Nb, even more preferably at least 30% Nb, still more preferably at least 40%, and sometimes at least 50%.

In certain example embodiments of this invention, IR reflecting layer 3 is sputter-deposited as metallic Nb. The IR reflecting layer 3 may be substantially pure metal in such embodiments.

In other example embodiments of this invention, IR reflecting layer 3 is sputter-deposited as niobium nitride. The stoichiometry of this layer 3 as deposited and/or thereafter may be represented, in certain example embodiments, by $Nb_xN_y$, where the ratio y/x (i.e., the ratio of N to Nb) is from 0.3 to 0.9, even more preferably from 0.4 to 0.8, still more preferably from 0.5 to 0.7, and most preferably from 0.55 to 0.65. For purposes of example only, niobium nitride in the form of $Nb_5N_3$ translates into a y/x ratio of 3/5 (i.e., 0.6). It has surprisingly been found that the aforesaid y/x ratio ranges for nitrides of niobium are particularly beneficial with respect to coating characteristics such as spectral curves and/or chemical resistance as explained in commonly owned Ser. No. 10/338,878, the disclosure of which is hereby incorporated herein by reference. For instance, nitriding of Nb in amounts greater than this may result in less chemical resistance of coating 5. In other words, if the y/x ratio is greater than the aforesaid range(s), chemical durability degrades. Also, if the y/x ratio is less than the aforesaid range(s), solar performance suffers in that not as much IR is blocked (reflected and/or absorbed) by the coating.

In other example embodiments of this invention, IR reflecting layer 3 is sputter-deposited so as to be of, or include, NbCr and/or $NbCrN_x$. In certain example embodiments of this invention, the Nb:Cr ratio in the NbCr and/or $NbCrN_x$ inclusive IR reflecting layer(s) 3 may be from about 0.75 to 50.0 (i.e., there may be from about 0.75 to 50.0 times as much Nb in the layer compared to Cr in the layer, with respect to atomic %). In certain example embodiments, the layer comprising NbCr (nitrided or not) may include from about 1-70 atomic % Cr, more preferably from about 1-30 atomic % Cr, and most preferably from about 3-20 atomic % Cr. It has surprisingly been found that the best thermal performance is achieved at low Cr amounts. However, stability upon HT may improve as Cr content increases. Thus, it can be seen that NbCr alloys herein are advantageous in many respects, regardless of whether or not they are nitrided or the like. These ranges are provided for purposes of example only. In embodiments where the IR reflecting layer 3 is of or includes $NbCrN_x$ (i.e., a nitride of NbCr), the ratio in the layer of nitrogen to the total combination of Nb and Cr may be represented, in certain example embodiments, by $(Nb+Cr)_xN_y$, where the ratio y/x (i.e., the ratio of N to Nb+Cr) is from 0.2 to 0.9, even more preferably from 0.3 to 0.8, still more preferably from 0.4 to 0.7. It has been found that the aforesaid y/x ratio ranges for nitrides of NbCr are particularly beneficial.

In other example embodiments of this invention, it has been found that the use of Zr and Nb in IR reflecting layer 3 allows the resulting coated article to realize excellent chemical and mechanical durability, and also good thermal performance. For example, the use of NbZr and/or $NbZrO_x$ in IR reflecting layer(s) 3 allows the resulting coated article(s) to achieve: (a) improved corrosion resistance to alkaline solutions such as NaOH (compared to layer stacks of $glass/Si_3N_4/Nb/Si_3N_4$ and $glass/Si_3N_4/NbN_x/Si_3N_4$); (b) excellent thermal performance comparable to that of Nb and $NbN_x$; (c) good mechanical performance such as scratch resistance; and/or (d) good color stability upon heat treatment (e.g., lower $\Delta E^*$ value(s) than coated articles with layer stacks of $glass/Si_3N_4/NiCr/Si_3N_4$). It has surprisingly been found that in certain example instances, the use of NbZr instead of Nb allows for even lower $\Delta E^*$ value(s).

Furthermore, in certain example $NbZrO_x$ embodiments; it has unexpectedly been found that oxiding (e.g., partial oxiding) is particularly beneficial with respect to lowering $\Delta E^*$ value(s). For example, in certain example embodiments, oxygen ($O_2$) gas flows when sputtering a NbZr target(s) may be from about 0.5 to 6 sccm/kW, more preferably from about 1 to 4 sccm/kW, and most preferably from about 2 to 3 sccm/kW (where kW is a unit of power used in sputtering). These oxygen flows, have been found to lead to significantly improved $\Delta E^*$ value(s). $\Delta E^*$ value(s) can be lowered even further due to oxiding the NbZr inclusive layer to form a layer comprising $NbZrO_x$, compared to non-oxided layers of NbZr and $NbZrN_x$.

In certain example embodiments where layer 3 includes Nb and Zr, the Zr:Nb ratio (atomic %) layer 3 may be from about 0.001 to 1.0, more preferably from about 0.001 to 0.60, and even more preferably from about 0.004 to 0.50, and still more preferably from 0.05 to 0.2 (e.g., 0.11). In certain example embodiments, with respect to metal content, the IR reflecting layer may include from about 0.1 to 60% Zr, more preferably from about 0.1 to 40% Zr, even more preferably from 0.1 to 20%, still more preferably from 0.1 to 15%, more preferably from about 0.4 to 15% Zr, and most preferably from 3 to 12% Zr (atomic %). Surprising durability improvement has been observed even for very low Zr contents, while at the same time thermal performance is comparable to the use of Nb. In embodiments where the IR reflecting layer 3 is of or includes $NbZrO_x$ (i.e., an oxide of NbZr), the atomic ratio in the layer of oxygen to the total combination of Nb and Zr may be represented, in certain example embodiments, by $(Nb+Zr)_xO_y$, where the ratio y/x (i.e., the ratio of oxygen to Nb+Zr) is from 0.00001 to 1.0, even more preferably from 0.03 to 0.20, and still more preferably from 0.05 to 0.15. This ratio is applicable before and/or after heat treatment. Thus, it can be seen that in certain example embodiments of this invention, the NbZr inclusive layer is partially oxided, although such oxidation is certainly material in that it results in significant advantages over non-oxided versions.

Surprisingly, it has been found that providing Cr inclusive barrier layer 5 directly over and contacting the Nb inclusive IR reflecting layer 3 allows for a resulting coated article having much improved chemical durability compared to a situation where the Cr inclusive barrier layer 5 was not present. In order to protect the Nb inclusive IR reflecting layer(s) 3 from alkaline attack and/or oxidation at elevated temperatures, such Nb inclusive IR reflecting layer(s) is/are protected by at least one Cr inclusive barrier layer 5. For example, and without limitation, the barrier layer 5 may consist essentially of Cr, chromium oxide ($CrO_x$), or chromium nitride ($CrN_x$) in certain example embodiments of this invention. For example, it has been experimentally demonstrated that even a very thin chromium nitride layer 5 (e.g., about 25 angstroms thick) greatly improves the chemical durability of the Nb inclusive layer 3, particularly resistance to alkaline solutions and to oxidation. In certain other example embodiments of this invention, the Cr or the barrier layer 5 may be replaced with Zr. Thus, in such example embodiments, the barrier layer 5 may be of or include Zr, $ZrO_x$, or $ZrN_x$ (although, Zr inclusive barrier layers would not be as good as Cr inclusive layers with respect to resistance to oxidation).

In certain example embodiments, the barrier layer may be of metallic Cr. In other example embodiments, it may be of or include CrN where the nitrogen content of the layer is from about 1 to 60%, more preferably from about 5-60%, even more preferably from about 20-60%.

While FIG. 1 illustrates a coating in a manner where Nb inclusive layer 3 is in direct contact with dielectric layer 2 and Cr or CrN barrier layer 5 is in direct contact with layers 3 and 4, the instant invention is not so limited. Other layer(s) may be provided. Thus, while the coating or layers thereof is/are "on" or "supported by" substrate 1 (directly or indirectly), other layer(s) may be provided therebetween. Thus, for example, the layer system and layers thereof shown in FIG. 1 are considered "on" the substrate 1 even when other layer(s) may be provided therebetween (i.e., the terms "on" and "supported by" as used herein are not limited to directly contacting).

Still referring to FIG. 1, while various thicknesses may be used consistent with one or more of the objects and/or needs discussed herein, according to certain non-limiting example embodiments of this invention, example thicknesses and materials for the respective layers on the glass substrate 1 are as follows (before and/or after HT):

TABLE 1

| | (Example non-limiting thicknesses) | | |
|---|---|---|---|
| Layer | Example Range (Å) | Preferred (Å) | Best (Å) |
| silicon nitride (layer 2): | 0-1,400 Å | 20-900 Å | 30-850 Å |
| $Nb_xN_y$ (layer 3): | 50-700 Å | 100-500 Å | 150-350 Å |
| $CrN_x$ (layer 5): | 10-200 Å | 15-50 Å | 20-40 Å |
| silicon nitride (layer 4): | 100-900 Å | 150-800 Å | 200-500 Å |

In certain exemplary embodiments, the color stability with lengthy HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the Same. Stated yet another way, the coated article has good color stability upon HT.

After heat treatment (HT) such as thermal tempering, in certain example embodiments of this invention coated articles have color characteristics as follows in Table 2. It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) (not shown in Table 2) means reflective color when viewed from the side of the coated article on which the coating 5 is provided.

TABLE 2

Color/Optical Characteristics due to/after Heat Treatment

|  | General | Preferred | Most Preferred |
| --- | --- | --- | --- |
| $\Delta E^*_G$ | <=3.0 | <=2.5 | <=2.0 |
| $\Delta E^*_T$ | <=5.0 | <=2.5 | <=2.0 |
| $a^*_G$ | −6 to +6 | −4 to +4 | −3 to +3 |
| $b^*_G$ | −30 to +25 | −25 to +20 | −20 to +10 |
| $\Delta a^*_G$ | <=1.6 | <=1.0 | <=0.8 |
| $\Delta b^*_G$ | <=1.5 | <=1.0 | <=0.6 |
| $\Delta L^*_G$ | <=5 | <=3 | <=2 |
| $T_{vis}$ (TY): | 8-80% | 10-50% | 10-30% |
| $R_s$ (Ω/sq): | <250 | <150 | <110 |

Coated articles herein may even have a glass side reflective $\Delta E^*$ value ($\Delta E^*_G$) of no greater than 1.8 or 1.2 in certain example embodiments of this invention.

Figure 2:
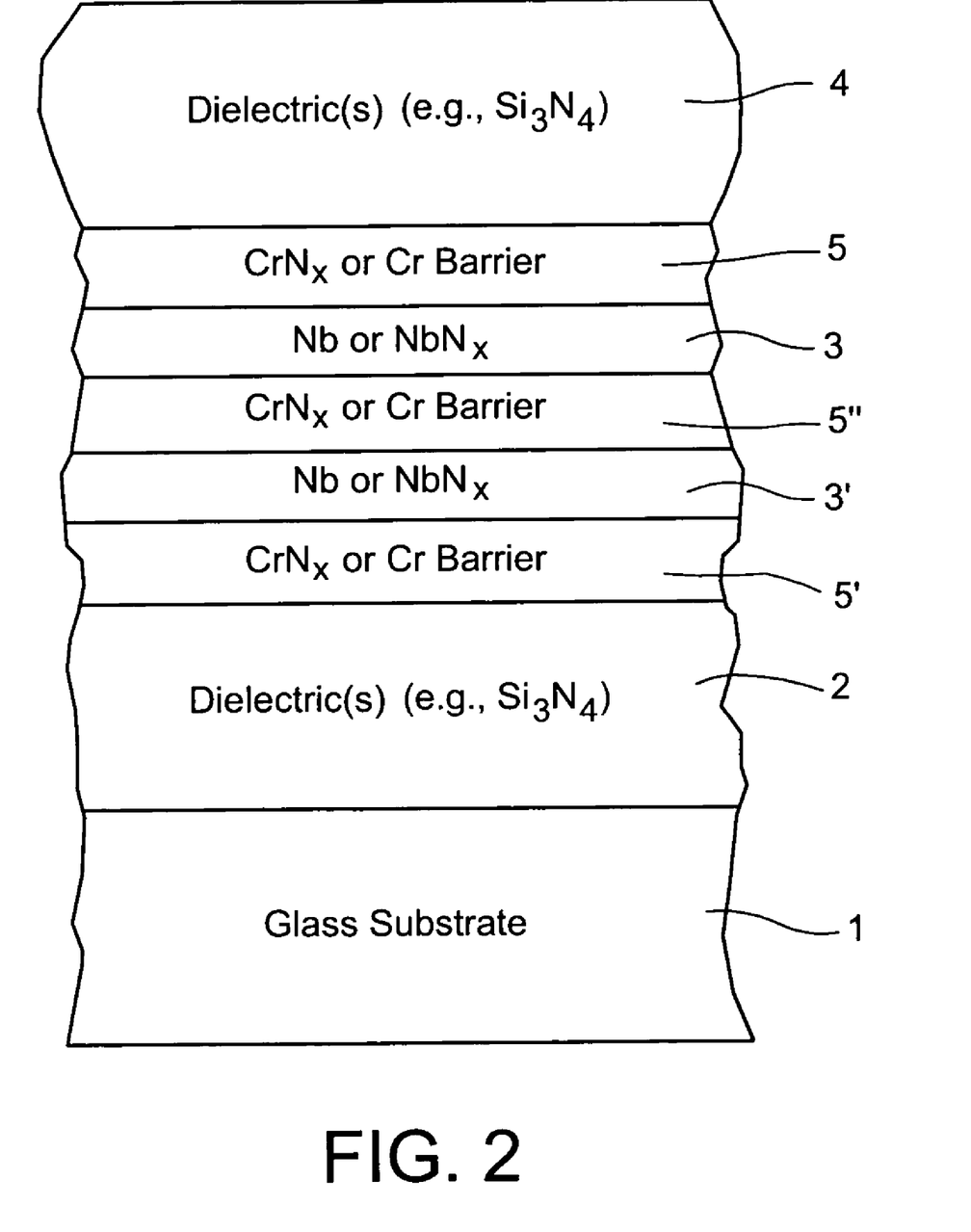
FIG. 2 is a partial cross sectional view of a coated article according to another example embodiment of this invention.

FIG. 2 illustrates another example embodiment of this invention. The FIG. 2 embodiment differs from the FIG. 1 embodiment in that additional Nb inclusive IR reflecting layer 3' and additional Cr or $CrN_x$ barrier layers 5' and 5" are provided. Layer 3' may be of any suitable material including those mentioned above with respect to Nb inclusive IR reflecting layer 3, whereas layers 5' and 5" may be of any suitable material including those mentioned above with respect Cr inclusive barrier layer 5.

Figure 3:
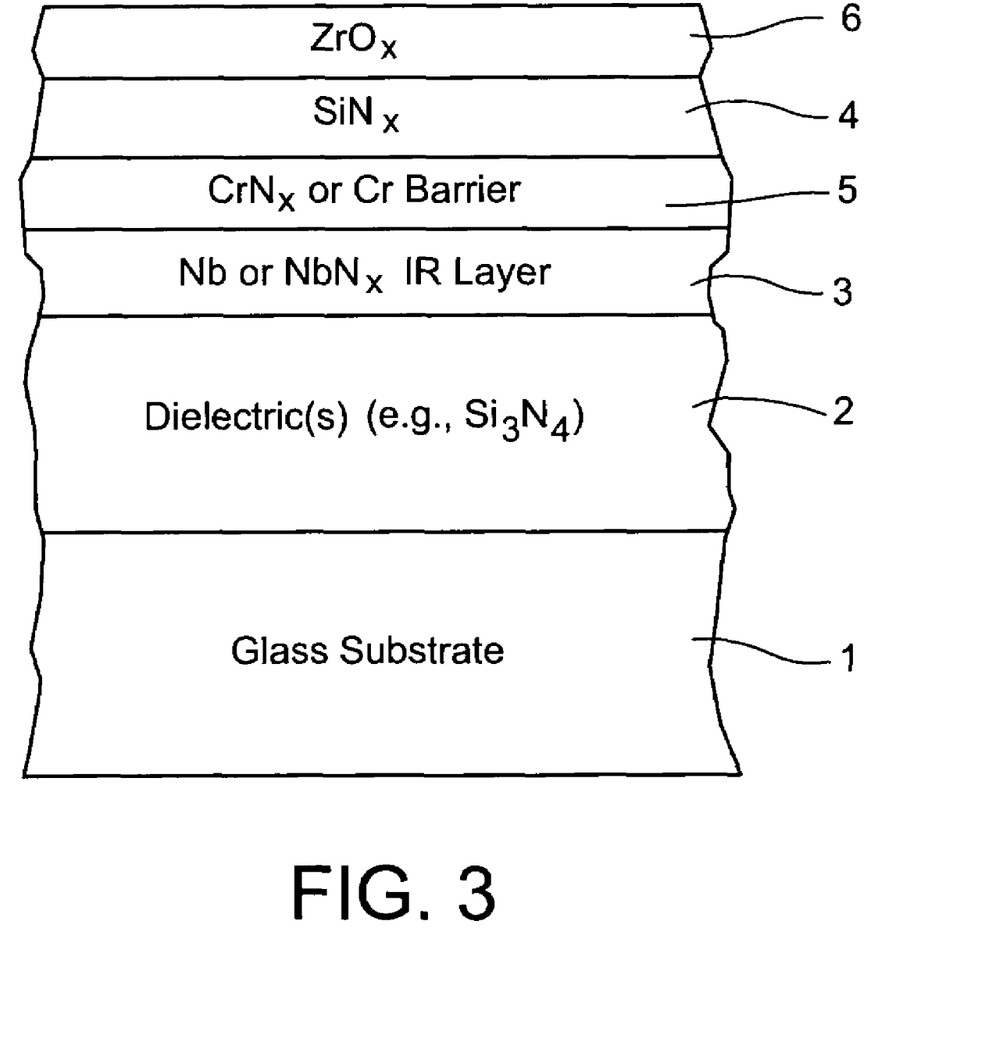
FIG. 3 is a partial cross sectional view of a coated article according to another example embodiment of this invention.

FIG. 3 illustrates another example embodiment of this invention. The FIG. 3 embodiment is the same as the FIG. 1 embodiment, except that it further includes a multi-layer overcoat comprising silicon nitride inclusive layer 4 and zirconium oxide inclusive layer 6. This overcoat has been found to significantly protect the Nb inclusive IR reflecting layer(s) under the same. This multi-layer overcoat 4, 6 may, or may not, be used in combination with the Cr inclusive barrier layer 5 in different embodiments of this invention. Certain example multi-layer overcoats in this regard are described in Ser. No. 10/406,003, filed Apr. 3, 2003, the disclosure of which is hereby incorporated herein by reference.

In the multi-layer layer overcoat of nitride/$ZrO_x$ shown in FIG. 3, the zirconium oxide 6 provides mechanical and chemical durability (e.g., improved scratch resistance and improved resistance to corrosion from alkaline solutions and the like), and the underlying nitride inclusive layer (e.g., silicon nitride) 4 provides both durability, and heat treatability by preventing significant amounts of oxygen from diffusing from the zirconium oxide into the IR reflecting layer 3 during heat treatment (HT). It has surprisingly been found that the combination of nitride/$ZrO_x$ in a multi-layer overcoat allows for a coated article which is chemically and mechanically durable, has acceptable optical properties such as transmittance and/or reflectance, and which is heat treatable in a commercially acceptable manner (i.e., with reasonable $\Delta E^*$ values). It has also been surprisingly found that the combination of nitride/$ZrO_x$ in a dual layer overcoat significantly improves a coated article's resistance to damage by high humidity environments, thereby improving storage life. In other example embodiments of this invention, the zirconium oxide may be replaced by chromium oxide, and the nitride thereunder is optional.

In certain example embodiments of this invention, the overcoat may include a series of alternating thin layers 4/6 comprising nitride (e.g., silicon nitride)/ZrO (e.g., superlattices). For example, in one example alternative embodiment of this invention, the overcoat may comprise the following layers going away from the glass substrate: nitride/$ZrO_x$/nitride/$ZrO_x$/nitride/$ZrO_x$ (where the nitride may be of or include silicon nitride, or any other suitable nitride). While such superlattices may start from silicon nitride, they may also start from Zr oxide in certain example embodiments of this invention (e.g., when oxidation of the layer below is desired or can be tolerated).

Figure 4:
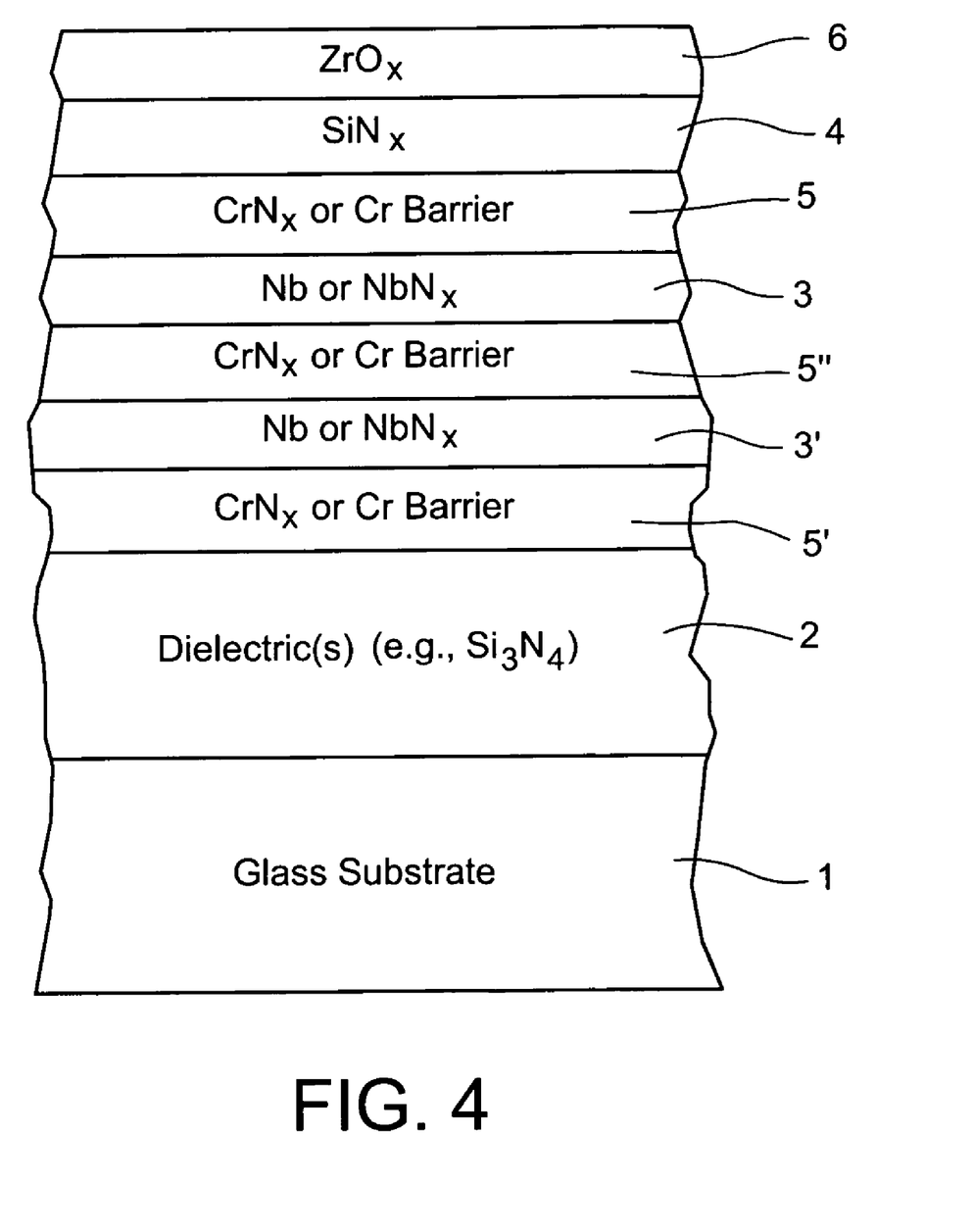
FIG. 4 is a partial cross sectional view of a coated article according to another example embodiment of this invention.

FIG. 4 illustrates another example embodiment of this invention. The FIG. 4 embodiment combines the multi-layer overcoat 4, 6 of the FIG. 3 embodiment with the underlying layer stack of the FIG. 2 embodiment.

Figure 5:
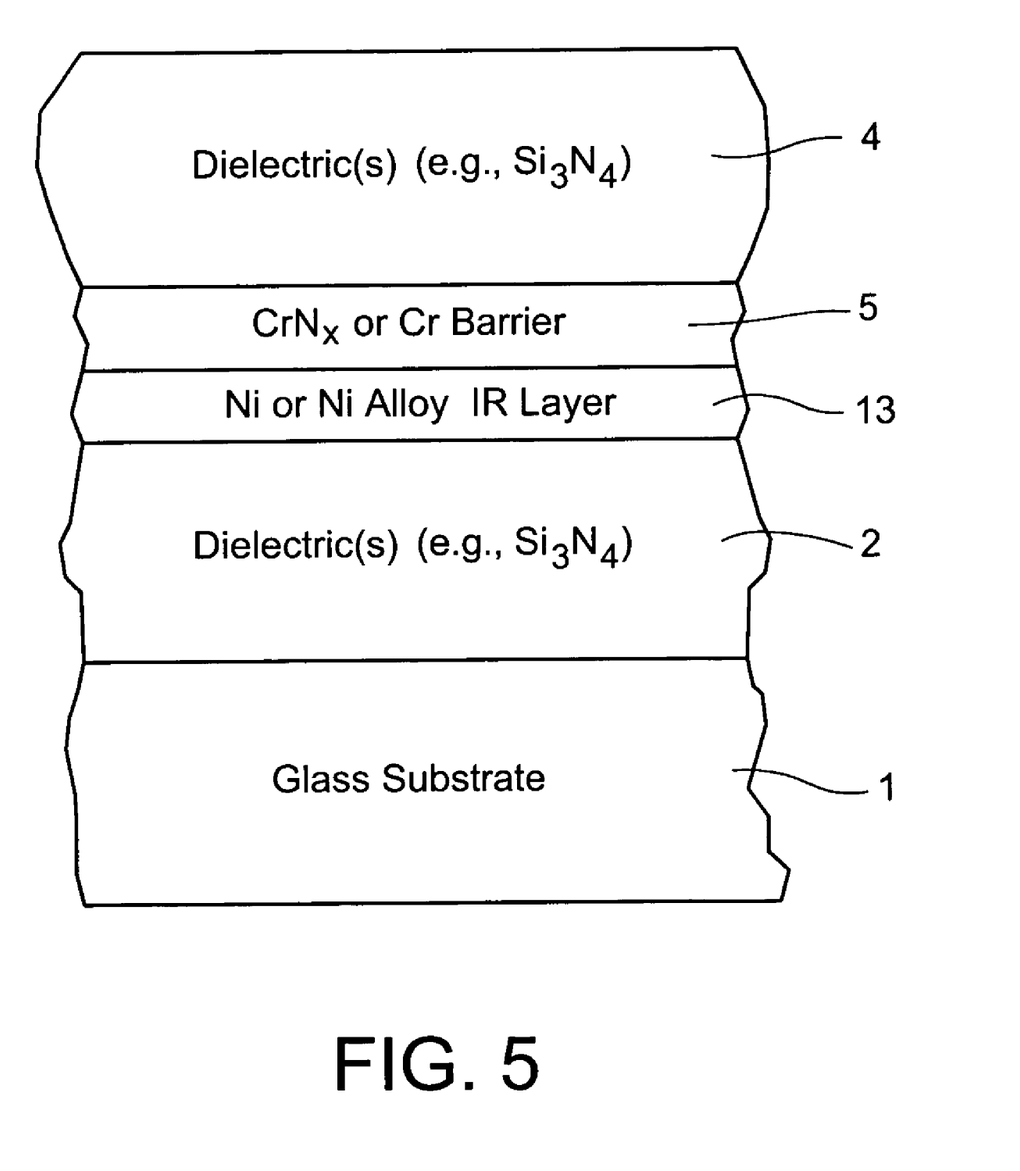
FIG. 5 is a partial cross sectional view of a coated article according to another example embodiment of this invention.

In other example embodiments of this invention, one, two or more of the aforementioned Nb inclusive layers (3, 3' and/or 3") may be replaced with Cr inclusive layers. Example Cr inclusive layers are metallic Cr, NiCr, $NiCrN_x$ or the like. For example, see another embodiment of the instant invention which is shown in FIG. 5. The FIG. 5 embodiment is similar to the FIG. 1 embodiment for example, except that the Nb inclusive layer 3 is replaced with a Cr inclusive layer 13.

While FIGS. 3 and 4 illustrate the overcoat layer 6 of the coating being of $ZrO_x$, this invention is not so limited. For example, the overcoat layer 6 in any embodiment herein by be of or include one or more of: an oxide of ZrY ($ZrYO_x$), a nitride of Zr (ZrN), an oxide of SiZr ($SiZrO_x$), and/or a nitride of SiZr ($SiZrN_x$). For example, the FIG. 6 embodiment includes an overcoat 15 may be of or include an oxide of ZrY ($ZrYO_x$), a nitride of Zr (ZrN), or a nitride and/or oxide of SiZr (e.g., $SiZrO_x$).

Figure 6:
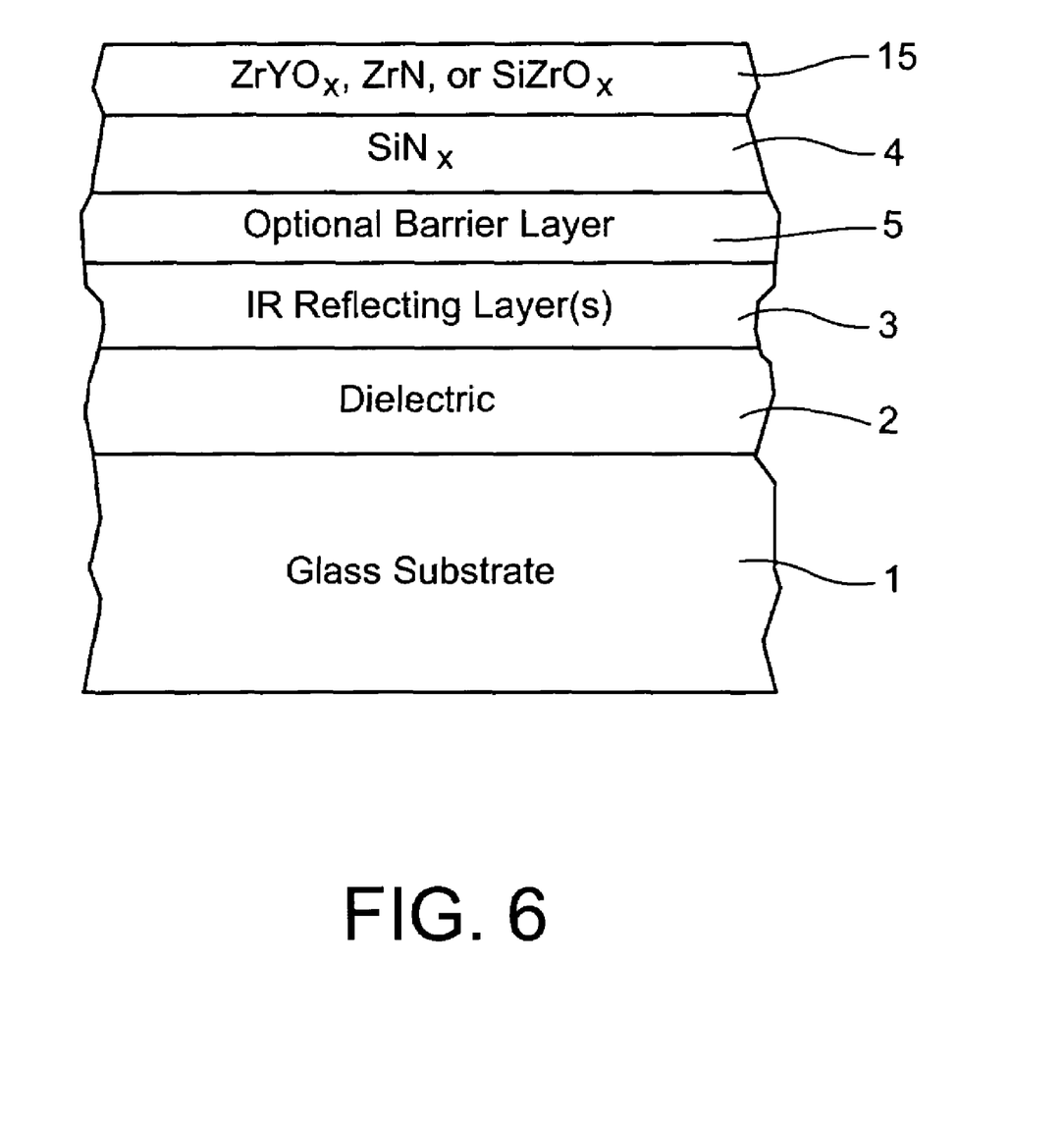
FIG. 6 is a partial cross sectional view of a coated article according to another example embodiment of this invention.

Referring to the FIG. 6 embodiment, it has surprising been found that an overcoat layer 15 of or including $ZrYO_x$ has excellent resistance to acids and alkaline solutions as does Zr oxide; but the $ZrYO_x$ has an improved microstructure that is more stable in HT than pure Zr oxide. Thus, it can be seen that $ZrYO_x$ has unexpected results associated therewith for an overcoat layer 15. In certain example embodiments of this invention which utilize a $ZrYO_x$ layer 15, the Y content thereof is from 1 to 20%, more preferably from 5 to 15%, with an example being about 7% (atomic %). In the FIG. 6 embodiment, for example, layers 4 and 5 are optional.

In other examples, it has been found that a layer 10 of or including $SiZrO_x$ had excellent chemical resistance, including good resistance to alkaline solutions (no damage after one hour NaOH boil). In certain examples of this invention an overcoat layer 10 of $SiZrO_x$ can be formed by sputtering a target including about 25% Zr (rangewise, from 10-50% Zr, more preferably from 20-30% Zr) and the remainder of the target essentially being made up of Si. Oxygen gas, of course, would be used in the sputtering chamber; optionally in combination with argon. Overcoats according to the FIG. 6 embodiment may be used in connection with single or double layer stacks (i.e., coatings have one, two or more IR reflecting layers).

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e.

the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the terms visible light transmittance (TY), infrared radiation transmittance, and ultraviolet radiation transmittance ($T_{uv}$) are known in the art. Total solar energy transmittance (TS) is then usually characterized as a weighted average of these values from 300 to 2500 mm (UV, visible and near IR). With respect to these transmittances, visible transmittance (TY), as reported herein, is characterized by the standard CIE Illuminant C, 2 degree observer, technique at 380-720 nm; near-infrared is 720-2500 nm; ultraviolet is 300-800 nm; and total solar is 300-2500 nm. For purposes of emittance, however, a particular infrared range (i.e. 2,500-40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". For example, chemical durability may be determined by boiling a sample of a coated glass substrate in about 500 cc of 5% HCl for one hour (i.e. at about 195° F.). Alternatively, chemical durability may be determined by an NaOH boil which includes boiling a sample of a coated glass substrate in a solution having a pH of about 12.2 that is a mixture of water and NaOH (about 0.4% NaOH); the solution is available from LabChem, Inc., Cat. No. LC 24270-4 (this is what is meant by NaOH boil herein). The NaOH boil may be carried out at a temperature of about 145 degrees F., or about 195 degrees F. in other instances.

The terms "heat treatment" and "heat treating" as used herein mean heating the article to a temperature sufficient to enabling thermal tempering, bending, and/or heat strengthening of the glass inclusive article. This definition includes, for example, heating a coated article to a temperature of at least about 580 degrees C. for a sufficient period to enable tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising at least the following layers from the glass substrate outwardly:
    a dielectric layer;
    a first Cr inclusive barrier layer;
    a first Nb inclusive IR reflecting layer located over and contacting the first Cr inclusive barrier layer;
    a second Cr inclusive barrier layer located over and contacting the first Nb inclusive IR reflecting layer;
    a second Nb inclusive IR reflecting layer located over and contacting the second Cr inclusive barrier layer;
    a third Cr inclusive barrier layer located over and directly contacting the second Nb inclusive IR reflecting layer; and
    another dielectric layer located over the third Cr inclusive barrier layer.

2. The coated article of claim 1, wherein at least two of the Cr inclusive barrier layers comprises chromium nitride.

3. The coated article of claim 1 wherein at least one of the dielectric layers comprises silicon nitride.

4. The coated article of claim 1, wherein the coated article is heat treated and has a ΔE* value (glass side reflective) of no greater than 3.0 after and/or due to heat treatment.

5. The coated article of claim 1, wherein the coated article has a visible transmission of from 8 to 80%.

6. The coated article of claim 1, wherein the coated article has a ΔE* value (glass side reflective) of no greater than 1.8 after and/or due to heat treatment.

7. The coated article of claim 1, wherein at least two of the Cr inclusive barrier layers consist essentially of Cr or a nitride of Cr.

8. The coated article of claim 1, wherein the coated article has no metallic infrared (IR) reflecting layer including Ag or Au.

9. The coated article of claim 1, wherein the coated article is an IG window unit, a monolithic window, or a laminated window.

10. The coated article of claim 1, wherein said another dielectric layer comprises silicon nitride and is in contact with the third Cr inclusive barrier layer.

11. The coated article of claim 1, wherein the dielectric layer is in contact with the glass substrate and comprises silicon nitride and has an index of refraction "n" of from 1.9 to 2.2.

* * * * *